US010296066B2

(12) United States Patent
Kim et al.

(10) Patent No.: US 10,296,066 B2
(45) Date of Patent: May 21, 2019

(54) SEMICONDUCTOR DEVICE, SEMICONDUCTOR SYSTEM, AND METHOD OF OPERATING THE SEMICONDUCTOR DEVICE

(71) Applicant: Samsung Electronics Co., LTD., Suwon-si, Gyeonggi-do (KR)

(72) Inventors: Ah Chan Kim, Hwaseong-si (KR); Jae Gon Lee, Yongin-si (KR); Min Joung Lee, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/415,106

(22) Filed: Jan. 25, 2017

(65) Prior Publication Data

US 2017/0214480 A1   Jul. 27, 2017

Related U.S. Application Data

(60) Provisional application No. 62/286,873, filed on Jan. 25, 2016, provisional application No. 62/286,860, filed on Jan. 25, 2016.

(30) Foreign Application Priority Data

Jan. 24, 2017   (KR) .................. 10-2017-0010943
Jan. 24, 2017   (KR) .................. 10-2017-0010945

(51) Int. Cl.
*H04J 3/06*   (2006.01)
*G06F 1/3234*   (2019.01)
(Continued)

(52) U.S. Cl.
CPC ............. *G06F 1/3234* (2013.01); *G06F 1/06* (2013.01); *G06F 13/42* (2013.01); *H04J 3/0658* (2013.01);
(Continued)

(58) Field of Classification Search
USPC ........................................... 370/519
See application file for complete search history.

(56) References Cited

U.S. PATENT DOCUMENTS 5,373,293 A    12/1994   Hirata
5,600,839 A    2/1997   MacDonald
(Continued)

FOREIGN PATENT DOCUMENTS

JP   11-143570     5/1999
JP   2005-173896   6/2005
(Continued)

OTHER PUBLICATIONS

US OA dated Jul. 5, 2018 in Related U.S. Appl. No. 15/415,041.
(Continued)

*Primary Examiner* — Phuongchau Ba Nguyen
(74) *Attorney, Agent, or Firm* — F. Chau & Associates, LLC (57) ABSTRACT

A system on chip (SoC) includes a control circuit configured to determine whether a requested operating mode is one of a functional mode and a monitoring mode. The control circuit is configured to provide a request signal to at least one clock circuit to request at least one clock signal and selectively output one of the at least one clock signal in response to at least one acknowledgment signal received from the at least one clock circuit, when the requested operating mode is the functional mode. The control circuit is configured to selectively output one of the at least one clock signal without providing the request signal, when the requested operating mode is the monitoring mode.

24 Claims, 6 Drawing Sheets

(51) Int. Cl.
*G06F 13/42* (2006.01)
*G06F 1/06* (2006.01)
*H04J 3/14* (2006.01)
*H04L 12/933* (2013.01)

(52) U.S. Cl.
CPC .............. *H04J 3/14* (2013.01); *H04L 49/109* (2013.01); *Y02D 10/14* (2018.01); *Y02D 10/151* (2018.01)

(56) References Cited

U.S. PATENT DOCUMENTS

| | | |
|---|---|---|
| 5,655,127 A | 8/1997 | Rabe et al. |
| 5,661,751 A | 8/1997 | Johnson |
| 5,793,993 A | 8/1998 | Broedner et al. |
| 5,978,930 A | 11/1999 | Furuta et al. |
| 6,021,501 A | 2/2000 | Shay |
| 6,437,617 B2 | 8/2002 | Saeki |
| 6,654,898 B1 | 11/2003 | Bailey et al. |
| 6,822,481 B1 | 11/2004 | Srikantam et al. |
| 6,889,331 B2 | 5/2005 | Soerensen et al. |
| 6,915,438 B2 | 7/2005 | Boros |
| 6,927,604 B2 | 8/2005 | Boerstler et al. |
| 7,111,183 B1 | 9/2006 | Klein et al. |
| 7,142,478 B2 | 11/2006 | Suh |
| 7,162,556 B2 | 1/2007 | Fujiki |
| 7,174,467 B1 | 2/2007 | Helms et al. |
| 7,245,161 B2 | 7/2007 | Boerstler et al. |
| 7,443,218 B2 | 10/2008 | Onouchi et al. |
| 7,797,561 B1 | 9/2010 | Abdalla et al. |
| 7,813,908 B2 | 10/2010 | Yen et al. |
| 7,894,042 B2 | 2/2011 | Turner et al. |
| 7,926,014 B2 | 4/2011 | Kawabe |
| 7,961,012 B2 | 6/2011 | Hong et al. |
| 7,971,086 B2 | 6/2011 | Itkin |
| 8,086,975 B2 | 12/2011 | Shiring et al. |
| 8,132,144 B2 | 3/2012 | Sundaresan et al. |
| 8,140,925 B2 | 3/2012 | Bellofatto et al. |
| 8,190,931 B2 | 5/2012 | Laurenti et al. |
| 8,289,048 B2 | 10/2012 | Cressman |
| 8,291,244 B2 | 10/2012 | Tune |
| 8,375,239 B2 | 2/2013 | Nara et al. |
| 8,533,648 B2 | 9/2013 | Sundaresan et al. |
| 8,572,418 B2 | 10/2013 | Singasani |
| 8,656,196 B2 | 2/2014 | de Cesare et al. |
| 8,826,047 B1 | 9/2014 | Zhu et al. |
| 8,892,931 B2 | 11/2014 | Kruglick |
| 8,898,502 B2 | 11/2014 | Maddigan et al. |
| 8,924,612 B2 | 12/2014 | Maji et al. |
| 8,996,906 B1 | 3/2015 | Townley et al. |
| 9,058,859 B2 | 6/2015 | Kang |
| 9,081,517 B2 | 7/2015 | Koniaris et al. |
| 9,152,598 B2 | 10/2015 | Fosse et al. |
| 9,172,377 B2 | 10/2015 | Peng |
| 9,766,648 B2 | 9/2017 | Hashim et al. |
| 2002/0152407 A1 | 10/2002 | Alia et al. |
| 2003/0117176 A1 | 6/2003 | Tardieux et al. |
| 2004/0153678 A1 | 8/2004 | Ahmad et al. |
| 2004/0243874 A1 | 12/2004 | Byers et al. |
| 2005/0232218 A1 | 10/2005 | Edwards et al. |
| 2006/0161797 A1 | 7/2006 | Grass et al. |
| 2006/0248367 A1 | 11/2006 | Fischer et al. |
| 2006/0248417 A1 | 11/2006 | Farmer et al. |
| 2008/0178024 A1 | 7/2008 | Kamegawa |
| 2008/0301604 A1 | 12/2008 | Itskovich et al. |
| 2009/0150706 A1 | 6/2009 | Oh et al. |
| 2011/0050300 A1 | 3/2011 | Klapproth et al. |
| 2011/0202788 A1 | 8/2011 | Hesse et al. |
| 2012/0131370 A1 | 5/2012 | Wang et al. |
| 2013/0055004 A1 | 2/2013 | Koniaris et al. |
| 2013/0124895 A1 | 5/2013 | Saha et al. |
| 2013/0173951 A1 | 7/2013 | Vogel |
| 2014/0082396 A1 | 3/2014 | Vahidsafa et al. |
| 2014/0089697 A1 | 3/2014 | Kim et al. |
| 2014/0266333 A1 | 9/2014 | Jouin et al. |
| 2015/0200669 A1 | 7/2015 | Cai et al. |
| 2015/0373313 A1 | 12/2015 | Kinebuchi et al. |
| 2016/0094337 A1 | 3/2016 | Choi et al. |
| 2016/0116934 A1 | 4/2016 | Ha |
| 2016/0350259 A1 | 12/2016 | Jeon et al. |

FOREIGN PATENT DOCUMENTS

| | | |
|---|---|---|
| JP | 2007-065756 | 3/2007 |
| JP | 2008-97594 | 4/2008 |
| JP | 2010-021793 | 1/2010 |
| JP | 5678849 | 3/2015 |
| KR | 1020060064146 | 6/2006 |
| KR | 10-0852885 | 8/2008 |
| KR | 10-1184182 | 9/2012 |
| KR | 1020160038671 | 4/2016 |
| KR | 1020160138786 | 12/2016 |

OTHER PUBLICATIONS

US OA dated Jul. 9, 2018 in Related U.S. Appl. No. 15/414,969.
US OA dated Aug. 28, 2018 in Related U.S. Appl. No. 15/414,819.
US NOA dated Sep. 17, 2018 in Related U.S. Appl. No. 15/415,162.
US OA dated Oct. 4, 2018 in Related U.S. Appl. No. 15/415,020.

SEMICONDUCTOR DEVICE, SEMICONDUCTOR SYSTEM, AND METHOD OF OPERATING THE SEMICONDUCTOR DEVICE

CROSS-REFERENCE TO RELATED APPLICATIONS

This application claims the benefit of U.S. Provisional Patent Application No. 62/286,873 filed on Jan. 25, 2016, U.S. Provisional Patent Application No. 62/286,860 filed on Jan. 25, 2016 in the United States Patent and Trademark Office, Korean Patent Application No. 10-2017-0010945 filed on Jan. 24, 2017 in the Korean Intellectual Property Office, and Korean Patent Application No. 10-2017-0010943 filed on Jan. 24, 2017 in the Korean Intellectual Property Office, the disclosures of which are incorporated by reference in their entireties herein.

BACKGROUND

1. Technical Field

The present disclosure relates to a semiconductor device, a semiconductor system, and a method of operating the semiconductor device.

2. Discussion of Related Art

A system-on-chip (SoC) may include one or more intellectual property (IP) blocks, a clock management unit (CMU), and a power management unit (PMU). The CMU may provide clock signals to one or more of the IP blocks, and may stop providing clock signals to the IP blocks that are not running, thereby reducing unnecessary waste of resources in a system employing the SoC.

To adjust the provision of clock signals, various clock sources included in the CMU may be controlled by software using a special function register (SFR). However, the response speed may be poor when the provisioning of clock signals is performed using software. Thus, there is a need for a hardware device and a method of controlling such a hardware device that can be used to provisional clock signals.

SUMMARY

According to an exemplary embodiment of the inventive concept, a system on chip (SoC) includes a control circuit configured to determine whether a requested operating mode is one of a functional mode and a monitoring mode. The control circuit is configured to provide a request signal to at least one clock circuit to request at least one clock signal and selectively output one of the at least one clock signal in response to at least one acknowledgment signal received from the at least one clock circuit, when the requested operating mode is the functional mode. The control circuit is configured to selectively output one of the at least one clock signal without providing the request signal, when the requested operating mode is the monitoring mode.

According to an exemplary embodiment of the inventive concept, a clock signal output circuit includes a clock multiplexing circuit configured to receive a plurality of clock signals from a plurality of clock components and a logic circuit. The logic circuit outputs a first request signal to the clock multiplexing circuit when a current mode is set to a functional mode. The clock multiplexing circuit outputs a second request signal to the clock components in response to the first request signal, and outputs one of the clock signals after receiving at least one acknowledgement signal from at least one of the clock components. The clock multiplexer outputs one of the clock signals without providing the second request signal when the current mode is set to a monitoring mode.

According to an exemplary embodiment of the inventive concept, a clock signal output circuit includes a clock dividing circuit configured to perform a dividing operation on a clock signal output by a clock component to generate a divided clock signal and a logic circuit. The logic circuit outputs a first request signal to the clock dividing circuit when a current mode is set to a functional mode. The clock dividing circuit outputs a second request signal to the clock component in response to the first request signal, and outputs the divided clock signal after receiving an acknowledgement signal from the clock component. The clock dividing circuit outputs the divided clock signal without providing the second request signal when the current mode is set to a monitoring mode.

According to an exemplary embodiment of the inventive concept, a method of operating a system on chip (SoC) includes: determining, by a control circuit of the SoC, whether to operate in one of a functional mode and a monitoring mode; when the control circuit determines to operate in the functional mode, providing, by the control circuit, a request signal to at least one clock circuit of the SoC; and outputting, by the control circuit, one of a plurality of clock signals output by the at least one clock circuit after receiving at least one acknowledgement signal from the at least one clock circuit, when the control circuit determines to operate in the monitoring mode, outputting, by the control circuit, one of the plurality of clock signals without providing the request signal.

BRIEF DESCRIPTION OF THE DRAWINGS

The present inventive concept will become more apparent by describing in detail exemplary embodiments thereof with reference to the attached drawings, in which.

DETAILED DESCRIPTION

Figure 1:
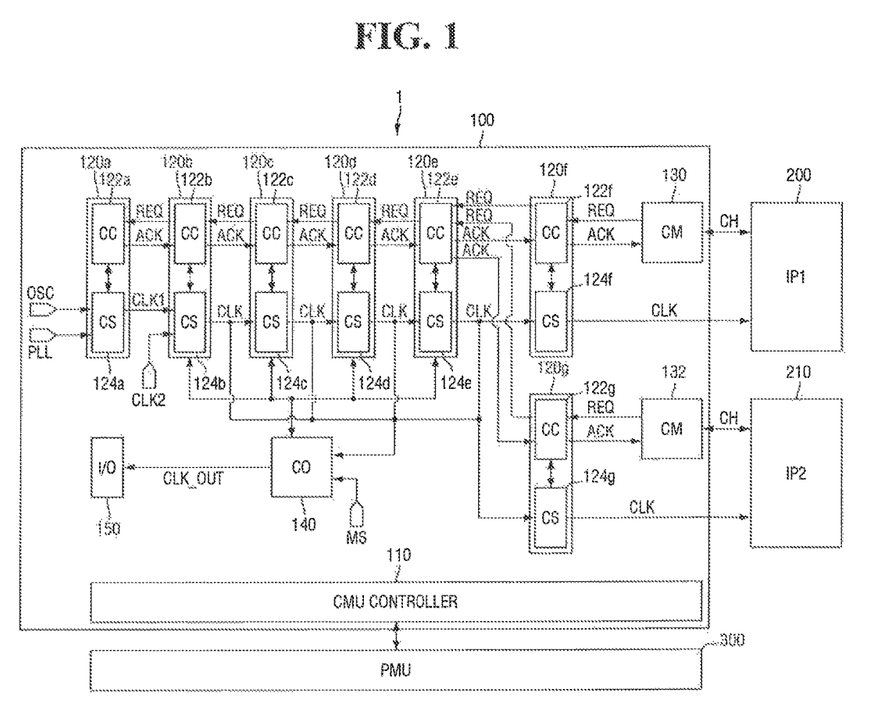
FIG. 1 is a schematic diagram of a semiconductor device according to an exemplary embodiment of the present inventive concept.

FIG. 1 is a schematic diagram of a semiconductor device 1 according to an exemplary embodiment of the present inventive concept.

Referring to FIG. 1, the semiconductor device 1 according to the present embodiment includes a clock management unit (CMU) 100, intellectual property (IP) blocks 200 and 210, and a power management unit (PMU) 300. In an embodiment, an IP block is an IP core or reusable unit of logic or chip layout that is the intellectual property of one party. In an embodiment, each of the IP blocks include a processor, a graphic processor, a memory controller, and input and output interface block, etc.

The PMU 300 controls a power supply to the semiconductor device. For example, when the semiconductor device enters a standby mode, the PMU 300 cuts off power supply to the SoC by turning off a power control circuit. Here, the PMU 300 continuously consumes power. However, since the power consumed by the PMU 300 is far smaller than that consumed by the entire semiconductor device, the power consumption of the semiconductor device is significantly reduced in the standby mode. The PMU 300 may cut off power supply to the CMU 100 if none of the IP blocks 200 and 210 have made a request for a clock signal within a pre-defined period of time. The semiconductor device 1 may be implemented as a system-on-chip (SoC) in various embodiments of the present disclosure, but the present inventive concept is not limited thereto.

The CMU 100 provides clock signals to the IP blocks 200 and 210. In the present embodiment, the CMU 100 includes clock components 120a, 120b, 120c, 120d, 120e, 120f, 120g, channel management circuits 130 and 132, and a CMU controller 110. The clock components 120a through 120g generate clock signals that are to be provided to the IP blocks 200 and 210, and the channel management circuits CM 130 and 132 are disposed between the clock components 120f and 120g and the IP blocks 200 and 210 to provide communication channels CH between the CMU 100 and the IP blocks 200 and 210. The CMU controller 110 provides clock signals to the IP blocks 200 and 210 using the clock components 120a through 120g.

In an embodiment of the present inventive concept, the communication channels CH provided by the channel management circuits 130 and 132 are implemented to follow Low Power Interface (LPI), Q-Channel Interface or P-Channel Interface of ARM Ltd. However, the present inventive concept is not limited thereto, and the communication channels CH can also be implemented to follow a different communication protocol.

The clock components 120a through 120g include clock sources (CS) 124a, 124b, 124c, 124d, 124e, 124f, 124g and clock control circuits (CC) 122a, 122b, 122c, 122d, 122e, 122f, 122g which control the clock sources 124a through 124g, respectively. The clock sources 124a through 124g may include, for example, a multiplexer (MUX) circuit, a clock dividing circuit, a shortstop circuit, and a clock gating circuit.

The clock components 120a through 120g form a parent-child relationship with each other. In the present embodiment, the clock component 120a is a parent of the clock component 120b, and the clock component 120b is a child of the clock component 120a and a parent of the clock component 120c. In addition, the clock component 120e is a parent of two clock components 120f and 120g, and the clock components 120f and 120g are children of the clock component 120e. In the present embodiment, the clock component 120a located closest to a phase locked loop (PLL) is a root clock component, and the clock components 120f and 120g located closest to the IP blocks 200 and 210 are leaf clock components. The parent-child relationship is also, inevitably, formed between the clock control circuits 122a through 122g and between the clock sources 124a through 124g according to the parent-child relationship between the clock components 120a through 120g.

The clock control circuits 122a through 122g exchange a clock request REQ and an acknowledgement ACK for the clock request REQ between a parent and a child and provide clock signals to the IP blocks 200 and 210. The first clock control circuit 122a (i.e., the root clock component), which receives a clock request REQ having an activated level (e.g., second logic level) from the clock control circuit 122b enables the first clock source 124a and transmits an acknowledgement ACK to the second clock control circuit 122b. The second clock control circuit 122b enables the second clock source 124b in response to receipt of the ACK from the first clock control circuit 122a, and transmits an ACK to the third clock control circuit 122c. The process repeats with the third, fourth, and fifth clock control circuits 122c-122e.

If the IP block 200 does not need a clock signal, for example, if the IP block 200 needs to be in a sleep state, the CMU 100 stops providing the clock signal to the IP block 200.

Specifically, the channel management circuit 130 transmits to the IP block 200 a first signal indicating that it will stop providing a clock signal under the control of the CMU 100 or the CMU controller 110. The IP block 200 which receives the first signal transmits to the channel management circuit 130 a second signal indicating that the provision of the clock signal can be stopped after the completion of an operation being processed. The channel management circuit 130 which receives the second signal from the IP block 200 requests the clock component 120f, i.e., its parent to stop providing the clock signal.

In an example, if the communication channel CH provided by the channel management circuit 130 follows Q-Channel Interface, the channel management circuit 130 transmits a QREQn signal having a first logic value (e.g., logic low, hereinafter indicated by reference character "L") to the IP block 200 as the first signal. Then, when receiving a QACCEPTn signal having the first logic value from the IP block 200 as the second signal, the channel management circuit 130 transmits a clock request REQ having the first logic value to the clock component 120f. In this case, the clock request REQ having the first logic value is a "clock provision stop request."

The clock control circuit 122f which receives the clock request REQ (i.e., the clock provision stop request) having the first logic value from the channel management circuit 130 stops providing a clock signal by disabling the clock source 124f (e.g., the clock gating circuit). Accordingly, the IP block 200 can enter a sleep mode. In this process, the clock control circuit 122f may provide an acknowledgement ACK having the first logic value to the channel management circuit 130. However, it should be noted that even if the channel management circuit 130 receives the acknowledgement ACK having the first logic value after transmitting the clock provision stop request having the first logic value, it does not guarantee the stoppage of clock provision by the clock source 124f. The acknowledgement ACK merely means the clock control circuit 122f is aware of the fact that the clock component 120f (i.e., a parent of the channel management circuit 130) no longer needs to provide a clock signal to the channel management circuit 130.

Meanwhile, the clock control circuit 122f of the clock component 120f transmits a clock request REQ having the first logic value to the clock control circuit 122e of the clock component 120e which is its parent. If the IP block 210 also does not need a clock signal, for example, if the clock control circuit 122e receives the clock provision stop request from the clock control circuit 122g, the clock control circuit 122e stops providing the clock signal by disabling the clock source 124e (e.g., the clock dividing circuit). Accordingly, the IP blocks 200 and 210 can enter the sleep mode.

The above operation may be performed in the same way for other clock control circuits 122a through 122d.

Although the clock control circuit 122f of the clock component 120f transmits the clock request REQ having the first logic value to the clock control circuit 122e of the clock component 120e which is its parent, if the IP block 210 is running, the clock control circuit 122e cannot disable the clock source 124e. Only when the IP block 210 no longer needs a clock signal, can the clock control circuit 122e disable the clock source 124e and transmit a clock request REQ having the first logic value to the clock control circuit 120d which is its parent. That is, the clock control circuit 122e can disable the clock source 124e only when receiving the clock provision stop request from both of the clock control circuits 122f and 122g.

When the IP blocks 200 and 210 are in the sleep state, all of the clock sources 124a through 124f may be disabled. Then, when the IP block 200 enters the running state, the CMU 100 resumes providing clock signals to the IP blocks 200 and 210.

The channel management circuit 130 transmits a clock request REQ having a second logic value (e.g., logic high, hereinafter indicated by reference character "H") to the clock control circuit 122f of the clock component 120f which is its parent and waits for an acknowledgement ACK from the clock control circuit 122f. Here, the clock request REQ having the second logic value is a "clock provision request," and the acknowledgement ACK for the clock provision request indicates that clock provision by the clock source 124f has been resumed. The clock control circuit 122f cannot immediately enable the clock source 124f (e.g., the clock gating circuit) but waits for the provision of a clock signal by its parent.

Then, the clock control circuit 122f transmits a clock request REQ (i.e., the clock provision request) having the second logic value to the clock control circuit 122e which is its parent and waits for an acknowledgement ACK from the clock control circuit 122e. This operation may be performed in the same way for the clock control circuits 122a through 122d.

The clock control circuit 122a, i.e., the root clock component which receives a clock request REQ having the second logic value from the clock control circuit 122b enables the clock source 124a (e.g., the MUX circuit) and transmits an acknowledgement ACK to the clock control circuit 122b. After the clock sources 124b through 124e are enabled sequentially in this way, the clock control circuit 122e finally transmits to the clock control circuit 122f an acknowledgement ACK notifying that the clock provision by the clock source 124e has been resumed. The clock control circuit 122f which receives the acknowledgement ACK provides a clock signal to the IP block 200 by enabling the clock source 124f and provides an acknowledgement ACK to the channel management circuit 130.

The clock control circuits 122a through 122g operate in a full handshake way (e.g., synchronous handshaking) in which a clock request REQ and an acknowledgement ACK for the clock request REQ are exchanged between a parent and a child. Accordingly, the clock control circuits 122a through 122g can control clock signals provided to the IP blocks 200 and 210 by controlling the clock sources 124a through 124g in a hardware-wise manner.

The clock control circuits 122a through 122g may transmit a clock request REQ to their parents or control the clock sources 124a through 124g by operating on their own or under the control of the CMU controller 110. In an embodiment of the present inventive concept, the clock control circuits 122a through 122g respectively include finite state machines (FSMs) which control the clock sources 124a through 124g according to a clock request REQ exchanged between a parent and a child.

In the present embodiment, the semiconductor device 1 further includes a clock signal output circuit 140 and an output pin 150. The clock signal output circuit (CO) 140 receives a plurality of clock signals CLK from the clock sources 124a through 124f and outputs any one clock output signal CLK_OUT of the clock signals CLK to the output pin 150. The clock output signal CLK_OUT output from the output pin (I/O) 150 may be used to monitor the clock signals CLK or may be functionally used to drive a device provided outside the semiconductor device 1. The clock signal output circuit 140 may either monitor the clock signals CLK or output a particular one of the clock signals CLK according to the state of an input operating mode control signal MS. In an embodiment, the clock output circuit 140 is driven by a reference clock signal of a different clock domain than the clock signals it receives to output. In an embodiment, the components within the clock output circuit 140 are driven by the reference clock signal.

While FIG. 1 shows a tree of clock components including a cascade of five clock components and two leaf clock components, the inventive concept is not limited thereto. In alternative embodiments, one or more of these clock components may be omitted. In a first embodiment, only the first clock component 120a and the first leaf clock component 120f are present, the second-fifth clock components 120b-120e are omitted, and the second leaf clock component 120g is omitted. In a second embodiment, only the second clock component 120b and the first leaf clock component 120f are present, the first clock component 120a is omitted, the third-fifth clock components 120c-120e are omitted, and the second leaf clock component 120g is omitted. In a third embodiment, only the third clock component 120c and the first leaf clock component 120f are present, the first-second clock components 120a-b are omitted, the fourth-fifth clock components 120d-e are omitted, and the second leaf clock component 120g is omitted. In a fourth embodiment, only the fourth clock component 120d and the first leaf clock component 120f are present, the first-third clock components 120a-c are omitted, the fifth clock component 120e is omitted, and the second leaf component 120g is omitted. In a fifth embodiment, only the fifth clock component 120e and the first leaf clock component 120f are present, the first-fourth clock components 120a-120d are omitted, and the second leaf clock component 120g is omitted. These embodiments may be varied further with various other combinations. For example, in a sixth embodiment, the first-second clock components 120a-120b are present, the first leaf clock component clock 120f is present, the third-fifth clock components 120b-e are omitted, and the second leaf clock component 120g is omitted.

In an exemplary embodiment, the clock component 120a is a PLL controller that receives a constant or variable frequency signal from an oscillator OSC or a PLL signal output by a PLL, and outputs one of the two received signals based on a certain condition. In an embodiment, when the PLL is powered down, the first clock component 120a switches from the PLL to the OSC. When the components need the PLL signal, the PLL controller outputs the PLL signal. When the components need the oscillator signal, the PLL controller outputs the oscillator signal. When a component using an output of the PLL is not present, in an embodiment of the inventive concept, the PLL controller turns off the PLL. In an alternate embodiment, when the component using the output of the PLL is not present, the PLL controller automatically controls the PLL to enter a bypass mode. In another alternate embodiment, when the component using the output of the PLL is not present, the PLL controller does not affect the operation of the PLL at all.

In an exemplary embodiment of the inventive concept, the clock component 120b is a clock multiplexer (MUX) unit that receives a first clock signal CLK1 output from clock component 120a and a second clock signal CLK2 that may be provided from an external source such as an external CMU.

In an exemplary embodiment, the clock component 120c is a clock dividing unit such as a clock divider circuit (e.g., a frequency dividing circuit). The clock divider circuit takes an input signal of an input frequency and generates an output signal with an output frequency of the input frequency divided by a clock division ratio. For example, the division ratio may be an integer greater than 1.

In an exemplary embodiment, the clock component 120d is a shortstop unit (e.g., shortstop circuit). In an embodiment, the shortstop unit provides a clock signal with a plurality of pulses during a first period, stops these pulses during a second period after the first period, and resumes the pulses during third period after the second period.

In an exemplary embodiment of the inventive concept, each of the leaf clock components 120f and 120g is a clock gating unit. In an embodiment where the leaf clock components 120f and 120g are clock gating units, each component includes a clock gate circuit.

Figure 2:
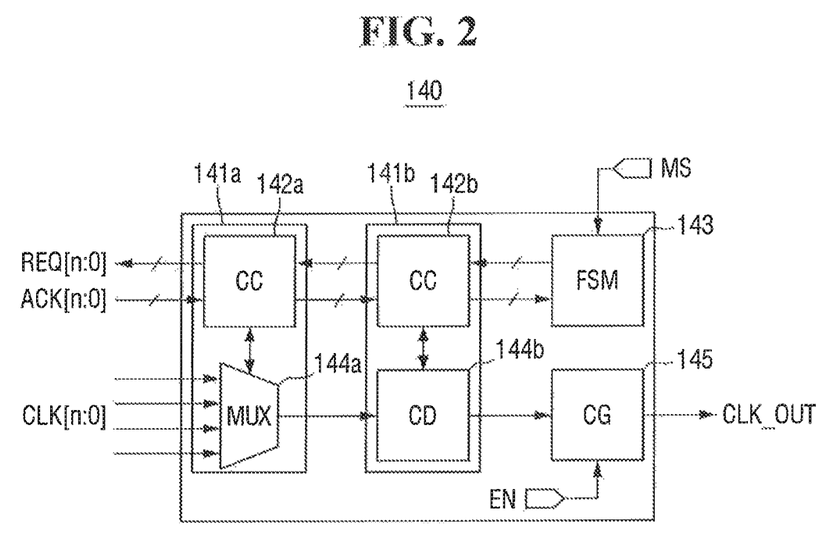
FIG. 2 is a schematic diagram of a clock signal output circuit according to an exemplary embodiment of the present inventive concept.

FIG. 2 is a schematic diagram of a clock signal output circuit 140 according to an exemplary embodiment of the present inventive concept.

Referring to FIG. 2, the clock signal output circuit 140 according to the present embodiment includes first and second clock components 141a and 141b, an FSM 143, and a clock gating circuit 145. The FSM 143 may be implemented by one or more logic circuits. In an embodiment, either the first clock component 141a or the second clock component 141b is omitted. When the first clock component 141a is omitted, clock source 144b only receives a single clock signal. In an embodiment, the first clock component 141a is driven by a reference clock signal having a different clock domain (e.g., different frequency) than the clock signals it receives (i.e., CLK[n:0]). In an embodiment, the second clock component 141b is driven by a reference clock signal having a different clock domain than the clock signal it receives from clock source 144a.

The first clock component 141a includes a clock control circuit (CC) 142a and a clock source (CS) 144a. Here, the clock source 144a includes a multiplexer MUX circuit which receives a plurality of clock signals CLK[n:0] and selects one of the clock signals CLK[n:0]. The clock control circuit 142a controls the clock source 144a in a hardware-wise manner, transmits one or more clock requests REQ[n:0] to the clock control circuits 122a through 122g, and receives one or more acknowledgements ACK[n:0] from the clock control circuits 122a through 122g. The clock control circuit 142a may control the clock source 144a in a hardware-wise manner by sending a control signal to the clock source 144a to select which of the input clock signals CLK[n:0] to output.

The second clock component 141b includes a clock control circuit (CC) 142b and a clock source 144b. Here, the clock source 144b includes a clock dividing (CD) circuit which divides a clock signal output from the clock source 144a by a dividing ratio. The dividing ratio may be an integer greater than 1 as an example. Since the clock signal output from the clock source 144a can have a high frequency which may be difficult for the output pin 150 of the semiconductor device 1 to operate with, the clock source 144b may be used to lower the frequency of the clock signal output from the clock source 144a. The clock control circuit 142b controls the clock source 144b in a hardware-wise manner, transmits a clock request to the clock control circuit 142a, and receives an acknowledgement from the clock control circuit 142a. The clock control circuit 142b may control the clock source 144b in a hardware-wise manner by sending a control signal to the clock source 144b that enables the clock source 144b to perform a dividing operation. The clock request transmitted to the clock control circuit 142a may indicate that the second clock component 141b needs a clock signal. The acknowledgement received by the clock control circuit 142b may indicate that the first clock component 141a has begun outputting the clock signal or that the first clock component 141a is aware that the second clock component 141b needs the clock signal.

The FSM 143 determines an operating state (mode) of the clock signal output circuit 140 according to an operating mode control signal MS. The clock signal output circuit 140 may operate in a "monitoring mode" for monitoring any one of a plurality of clock signals output from the clock sources 124a through 124g or in a "functional mode" for transmitting the any one of the clock signals to a device provided outside the semiconductor device 1. For example, the clock signal output circuit 140 operates in the monitoring mode when the operating mode control signal MS is at a first logic level and operates in the functional mode when the operating mode control signal MS is at a second logic level different from the first logic level. In an embodiment, the FSM 143 does not change its mode until it receives an acknowledgement signal. For example, if the current mode of the FSM 143 is the monitoring mode, and it receives an operating mode control signal MS indicating it should change to the functional mode, the FSM 143 may output a request signal to cause clock signals to be output by the clock components (e.g., 120a-120g), and then upon receiving at least one acknowledgement signal from these clock components, the FSM 143 can change its mode to the functional mode. If the FSM 143 does not receive the at least one acknowledgement signal within a certain time period, the FSM 143 can either remain in the monitoring mode or re-send the request signal. In an embodiment, the second clock component 141b communicates with the first clock component 141a and the FSM 143 using synchronous handshaking (i.e., using requests and acknowledges).

The clock gating circuit 145 gates a clock signal CLK_OUT output from the clock signal output circuit 140 according to an enable signal EN, thereby preventing an unnecessary clock signal from being output when the clock signal output circuit 140 is not used.

In an exemplary embodiment of the present inventive concept, the operating mode control signal MS and the enable signal EN are provided by software using a special function register (SFR). However, the present inventive concept is not limited thereto, and a control circuit which generates the operating mode control signal MS and the enable signal EN can also be implemented in the semiconductor device 1.

Figure 3:
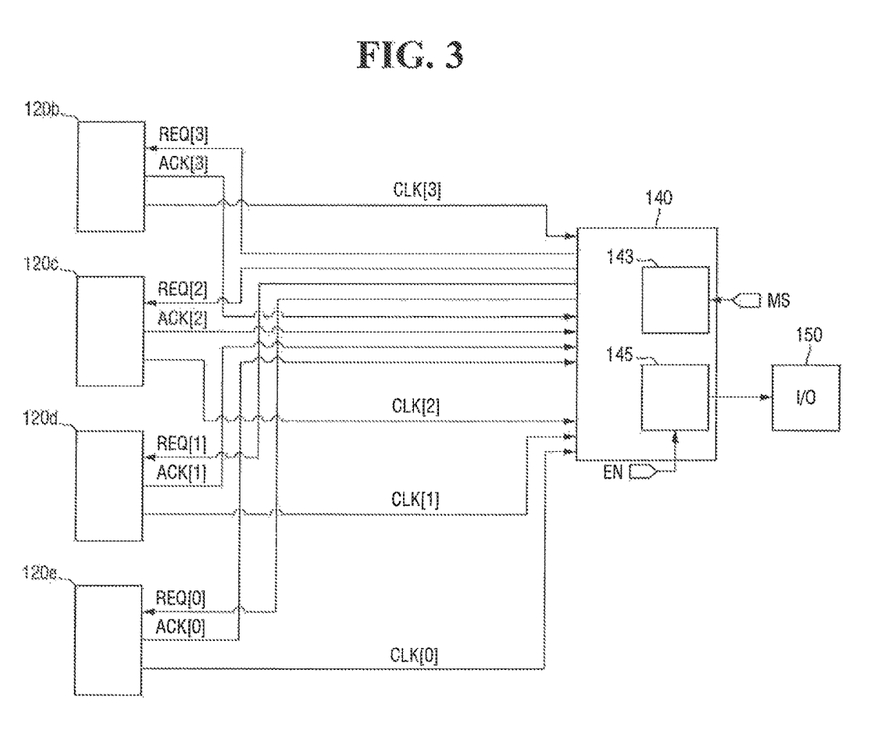
FIG. 3 is a schematic diagram illustrating a method of operating the clock signal output circuit according to an exemplary embodiment of the present inventive concept.

FIG. 3 is a schematic diagram illustrating a method of operating the clock signal output circuit 140 according to an exemplary embodiment of the present inventive concept.

Referring to FIG. 3, the clock signal output circuit 140 is depicted as operating in the functional mode. When the clock signal output circuit 140 is operating in the functional mode to provide a clock signal for driving a device outside the semiconductor device 1, the clock signal output circuit 140 operates as a clock component described above with reference to FIG. 1.

Specifically, in the functional mode, the clock signal output circuit 140 may transmit a clock request REQ[3:0] to its parent clock components 120b through 120e and receive an acknowledgement ACK[3:0] in response to the clock request REQ[3:0]. That is, to drive a device provided outside the semiconductor device 1, the clock signal output circuit 140 may transmit the clock request REQ[3:0] to each of the parent clock components 120b through 120e.

The clock request REQ[3:0] transmitted from the clock signal output circuit 140 may be forwarded to each of the parent clock components 120b through 120e. For example, the clock request REQ[3] may be forwarded to the parent clock component 120b and the clock request REQ[2] may be forwarded to the parent clock component 120c. The acknowledgement ACK[3:0] transmitted from each of the parent clock components 120b through 120e may be forwarded to the clock signal output circuit 140. For example, the acknowledgement ACK[3] from the parent clock component 120b and the acknowledgement ACK[2] from the parent clock component 120c may be forwarded to the clock signal output circuit 140.

The clock signal output circuit 140 selects any one of clock signals CLK[0] through CLK[3] received from the parent clock components 120b through 120e and outputs the selected clock signal to the output pin 150.

Figure 4:
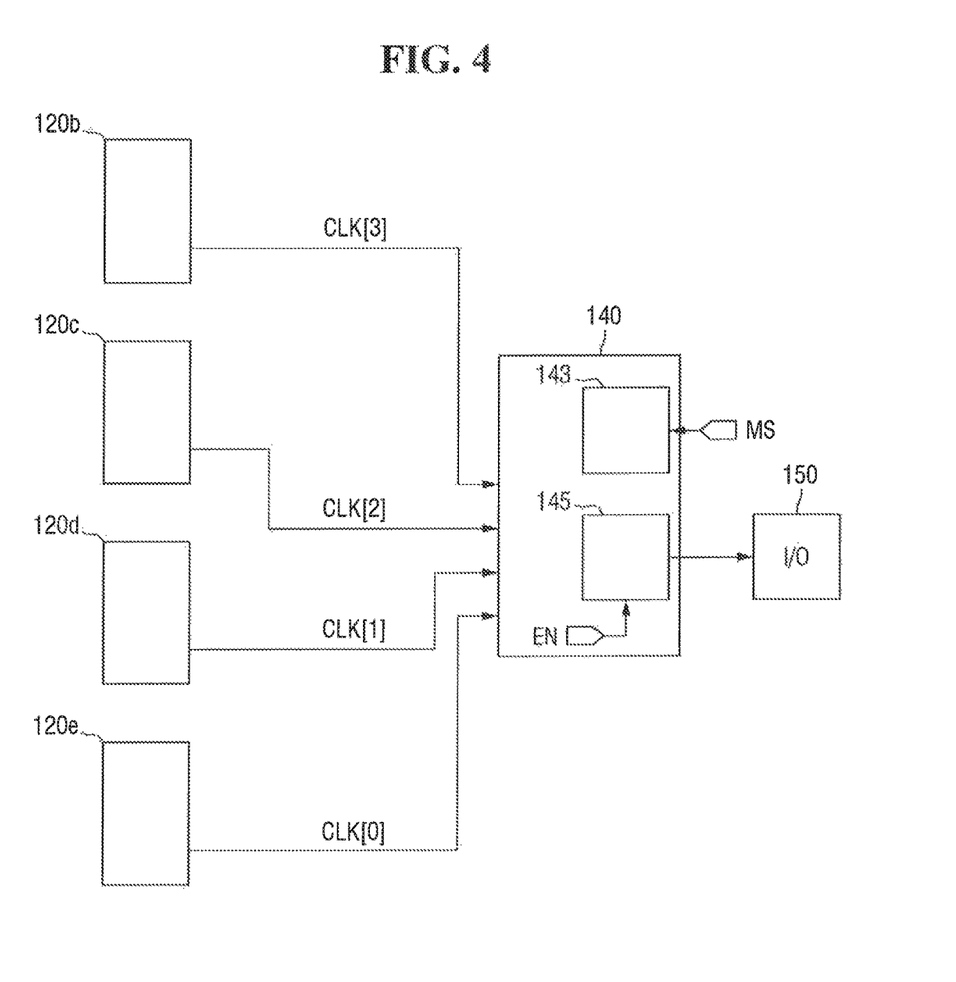
FIG. 4 is a schematic diagram illustrating a method of operating the clock signal output circuit according to an exemplary embodiment of the present inventive concept.

FIG. 4 is a schematic diagram illustrating a method of operating the clock signal output circuit 140 according to an exemplary embodiment of the present inventive concept.

Referring to FIG. 4, the clock signal output circuit 140 is depicted as operating in the monitoring mode. When the clock signal output circuit 140 is operating in the monitoring mode to monitor clock signals inside the semiconductor device 1, the clock signal output circuit 140 does not transmit any clock request to its parent clock components 120b through 120e. This is because when the clock signal output circuit 140 transmits a clock request to any one of the parent clock components 120b through 120e, the configuration for clock signals inside the semiconductor device 1 is changed, which may prevent accurate monitoring.

The clock signal output circuit 140 selects any one of clock signals CLK[0] through CLK[3] received from the parent clock components 120b through 120e and outputs the selected clock signal to the output pin 150.

Figure 5:
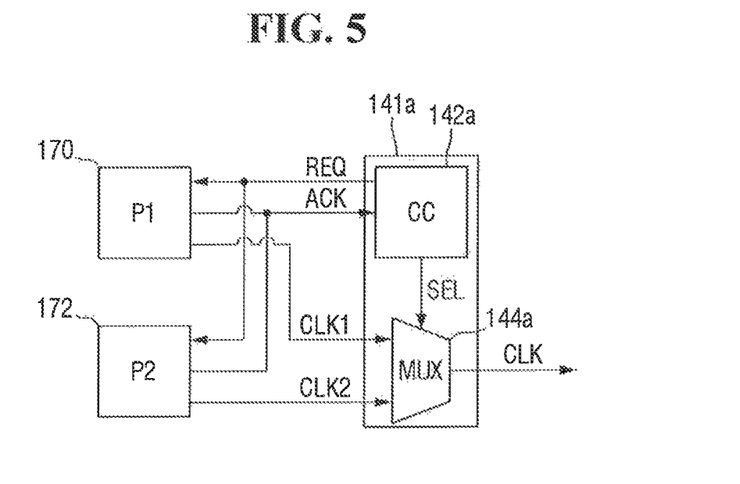
FIG. 5 is a schematic diagram illustrating a method of operating the clock signal output circuit according to an exemplary embodiment of the present inventive concept.

FIG. 5 is a schematic diagram illustrating a method of operating the clock signal output circuit 140 according to an exemplary embodiment of the present inventive concept.

Referring to FIG. 5, the clock source 144a of the clock signal output circuit 140 includes the MUX circuit. Therefore, the clock source 144a selects any one of a plurality of inputs, i.e., a plurality of clock signals CLK[n:0] according to a select signal SEL provided by the clock control circuit 142a.

When the clock control circuit 142a of the clock signal output circuit 140 needs to change a value of the select signal SEL during the operation of the semiconductor device 1, the clock control circuit 142a transmits a clock request REQ to its parent clock control circuits. To this end, the clock control circuit 142a of the clock signal output circuit 140 may generate, on its own, the clock request REQ that is to be transmitted to the parent clock control circuits.

Specifically, if parents of the clock signal output circuit 140 include a first parent (P1) 170 which is currently providing a clock signal to the clock source 144a and a second parent (P2) 172 which desires to provide a clock signal to the clock source 144a, the clock control circuit 142a transmits the clock request REQ to both of the parents 170 and 172 to deselect the clock signal being provided by the first parent (P1) 170 and to select the clock signal that is to be provided by the second parent (P2) 172 by changing the value of the select signal SEL. Accordingly, when it is guaranteed that the clock signals are being provided to the clock source 144a from both of the parents 170 and 172, the clock control circuit 142a of the clock signal output circuit 140 then provides the select signal SEL having the changed value to the clock source 144a.

The fact that the clock signals are being provided to the clock source 144a from both of the parents 170 and 172 can be ascertained from an acknowledgement ACK received from a clock control circuit of each of the parents 170 and 172. That is, after the clock control circuit 142a receives the acknowledgement ACK for the clock request REQ from the clock control circuit of each of the parents 170 and 172, the clock source 144a can change its selection according to the changed select signal SEL. For example, if the MUX 144a is currently outputting a first clock signal CLK1 due to the select signal SEL being set to a first logic level, and the clock control circuit 142a needs to cause output of the second clock signal CLK2, the clock control circuit 142a outputs the clock request REQ to both of the parents 170 and 172, and then changes the select signal SEL to a second logic level only after receiving an acknowledgement ACK from both parents 170 and 172.

Figure 6:
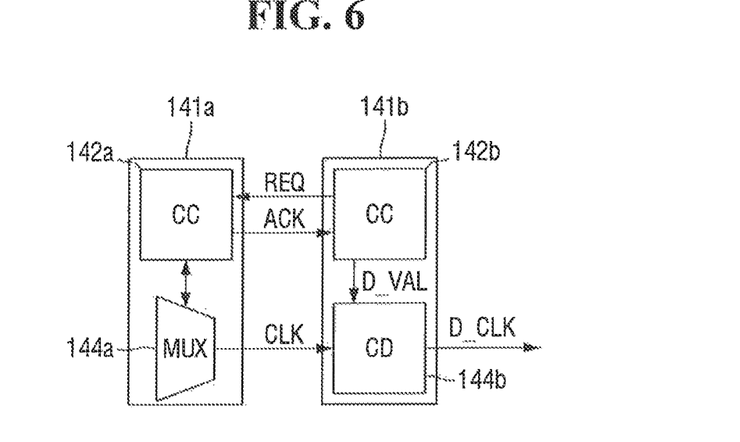
FIG. 6 is a schematic diagram illustrating a method of operating the clock signal output circuit of according to another embodiment of the present disclosure.

FIG. 6 is a schematic diagram illustrating a method of operating the clock signal output circuit 140 according to an exemplary embodiment of the present inventive concept.

Referring to FIG. 6, the clock source 144b of the clock signal output circuit 140 includes the clock dividing circuit. Therefore, the clock source 144b may generate a divided clock signal D_CLK by dividing a clock signal CLK output from the clock source 144a based on a division ratio D_VAL provided by the clock control circuit 142b.

When the clock control circuit 142b of the clock signal output circuit 140 needs to change a value of the division ratio D_VAL during the operation of the semiconductor device 1, the clock control circuit 142b transmits a clock request REQ to the clock control circuit 142a. To this end, the clock control circuit 142b of the clock signal output circuit 140 may generate, on its own, the clock request REQ that is to be transmitted to the clock control circuit 142a.

Accordingly, when it is guaranteed that the clock signal CLK is being provided to the clock source 144b from the clock source 144a, the clock control circuit 142b of the clock signal output circuit 140 may transmit the division ratio D_VAL having the changed value to the clock source 144b.

The fact that the clock signal CLK is being provided to the clock source 144b from the clock source 144a can be ascertained from an acknowledgement ACK received from the clock control circuit 142a. That is, after the clock control circuit 142b receives the acknowledgement ACK for the clock request REQ from the clock control circuit 142a, the clock source 144*b* can divide the clock signal CLK according to the changed division ratio D_VAL. For example, if the clock dividing circuit 144*b* previously or is currently outputting a divided clock signal D_CLK that was generated as a result of dividing an input clock signal CLK by a division ratio D_VAL of a first value, and the clock control circuit 142*b* needs to change the value of the division ratio D_VAL to a second other value, the clock control circuit 142*b* outputs a clock request REQ to the clock control circuit 142*a*, and then changes the division ratio D_VAL to the second value only after receiving an acknowledgement ACK from the clock control circuit 142*a*.

Figure 7:
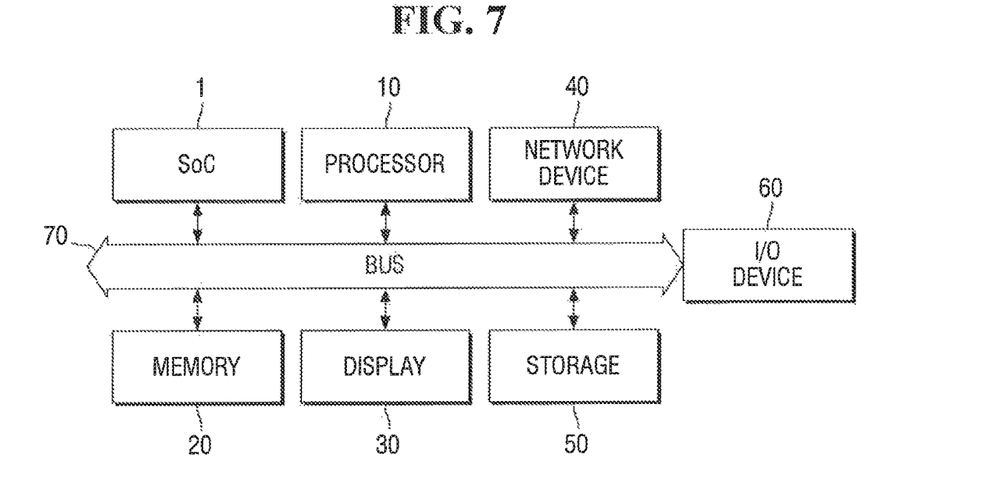
FIG. 7 is a block diagram of a semiconductor system to which a semiconductor device and a method of operating the semiconductor device according to embodiments of the present inventive concept can be applied.

FIG. 7 is a block diagram of a semiconductor system to which a semiconductor device and a method of operating the semiconductor device according to embodiments of the present inventive concept can be applied.

Referring to FIG. 7, the semiconductor system to which the semiconductor device and the method of operating the semiconductor device according to the embodiments of the present inventive concept can be applied includes an SoC 1 having the above-described features, a processor 10, a memory 20, a display 30, a network device 40, a storage device 50, and an input/output (I/O) device 60. The SoC 1, the processor 10, the memory 20, the display 30, the network device 40, the storage device 50, and the I/O device 60 can exchange data with each other through a bus 70.

IP blocks of the SoC 1 which have been mentioned in various embodiments of the present disclosure may include at least one of a memory controller which controls the memory 20, a display controller which controls the display 30, a network controller which controls the network device 40, a storage controller which controls the storage device 50, and an input/output (I/O) controller which controls the I/O device 60. The semiconductor system may further include an additional processor 10 which controls these devices.

While the present inventive concept has been particularly shown and described with reference to exemplary embodiments thereof, it will be understood by those of ordinary skill in the art that various changes in form and detail may be made therein without departing from the spirit and scope of the present inventive concept.

What is claimed is:

1. A system on chip (SoC) comprising:
a clock management unit (CMU) comprising a plurality of clock circuits, a control circuit and an output pin, the CMU configured to receive a request signal from a first external device or the control circuit, and generate a clock signal using the plurality of clock circuits in response to the request signal,
wherein the control circuit is configured to determine whether the CMU is to operate in one of a functional mode and a monitoring mode,
wherein the control circuit is configured to provide the request signal to at least one of the clock circuits and selectively provide one of a plurality of outputs of the clock circuits to the output pin in response to at least one acknowledgment signal received from at least one of the clock circuits, when the CMU is determined to operate in the functional mode, and
wherein the control circuit is configured to selectively provide one of the plurality of outputs to the output pin without providing the request signal to any of the clock circuits, when the CMU is determined to operate in the monitoring mode.

2. The SoC of claim 1, wherein the control circuit comprises a finite state machine configured to determine whether the CMU is to operate in the functional mode or the monitoring mode in response to a received mode control signal.

3. The SoC of claim 1, wherein the outputs provide at least one internal clock signal and the control circuit is driven by a reference clock signal of a different clock domain than the at least one internal clock signal.

4. The SoC of claim 1, wherein the control circuit comprises a clock gating circuit that is configured to selectively provide the one output to the output pin in response to an enable signal.

5. The SoC of claim 1, wherein the control circuit comprises:
a first clock control circuit configured to receive the at least one acknowledgement signal, provide the request signal, and output a select signal; and
a multiplexer configured to receive the outputs and provide one of the received outputs based on receipt of the select signal.

6. The SoC of claim 5, wherein the first clock control circuit changes the select signal to a new value only after receiving an acknowledgement signal from a first one of the clock circuits generating a clock signal currently being output by the multiplexer and an acknowledgement signal from a second other one of the clock circuits generating a clock signal to next be output by the multiplexer.

7. The SoC of claim 5, wherein control circuit further comprises:
a second clock control circuit configured to receive the at least one acknowledgement signal from the first clock control circuit, provide the request signal to the first clock control circuit, and output a division ratio; and
a clock dividing circuit configured to perform a dividing operation on the clock signal output by the multiplexer using the dividing ratio to generate a divided clock signal, and output the divided clock signal as the one output.

8. The SoC of claim 7, wherein the second clock control circuit changes the division ratio to a new value only after receiving acknowledgement signal from the first clock control circuit.

9. The SoC of claim 1, wherein the output pin is configured to provide the one output to a second external device.

10. The SoC of claim 1, wherein the clock circuits communicate with one another using synchronous handshaking to provide the clock signal to the first external device, wherein the first external device is an intellectual property (IP) block.

11. A semiconductor system comprising the SoC of claim 10.

12. The semiconductor system of claim 11, further comprising a memory, wherein the IP block is a memory controller configured to control the memory.

13. The semiconductor system of claim 11, further comprising a display, wherein the IP block is a display controller configured to control the display.

14. The semiconductor system of claim 11, further comprising a network device, wherein the IP block is a network controller configured to control the network device.

15. The semiconductor system of claim 11, further comprising a bus enabling the SoC to communicate with the IP block.

16. A clock signal output circuit configured to communicate with a clock management unit (CMU) comprising a plurality of clock circuits, the CMU configured to generate a clock signal using the clock circuits in response to a request signal, the clock signal output circuit comprising:

a clock multiplexing circuit configured to receive a plurality of clock signals from a outputs of the plurality of clock circuits, a logic circuit; and an output pin, wherein the logic circuit outputs a control signal to the clock multiplexing circuit when a current mode is set to a functional mode, wherein the clock multiplexing circuit outputs the request signal to the clock circuits in response to the control signal, and outputs one of the outputs to the output pin after receiving at least one acknowledgement signal from at least one of the clock circuits, and wherein the clock multiplexing circuit outputs one of the outputs to the output pin without providing the request signal to any of the clock circuits when the current mode is set to a monitoring mode.

17. The clock signal output circuit of claim 16, further comprising a clock gate circuit configured to selectively output the one output in response to an enable signal.

18. A system on chip comprising the clock signal output circuit of claim 16.

19. A clock signal output circuit configured to communicate with a clock management unit (CMU) comprising a clock circuit, the CMU configured to generate a clock signal using the clock circuit in response to a request signal, the clock signal output circuit comprising:

a clock dividing circuit configured to perform a dividing operation on the clock signal output by the clock circuit to generate a divided clock signal;

a logic circuit; and an output pin, wherein the logic circuit outputs a signal to the clock dividing circuit when a current mode is set to a functional mode, wherein the clock dividing circuit outputs the request signal to the clock circuit in response to the control signal, and outputs the divided clock signal to the output pin after receiving an acknowledgement signal from the clock circuit, and wherein the clock dividing circuit outputs the divided clock signal to the output pin without providing the request signal to the clock circuit when the current mode is set to a monitoring mode.

20. The clock signal output circuit of claim 19, further comprising a clock gate circuit configured to selectively output the divided clock signal in response to an enable signal.

21. A system on chip comprising the clock signal output circuit of claim 19.

22. A method of operating a system on chip (SoC) comprising a clock management unit (CMU) comprising a plurality of clock circuits, a control circuit and an output pin, the CMU configured to receive a request signal from a first external device or the control circuit, and generate a clock signal using the plurality of clock circuits in response to the request signal, the method comprising:

determining, by the control circuit of the SoC, whether to operate in one of a functional mode and a monitoring mode;

when the control circuit determines to operate in the functional mode, providing, by the control circuit, the request signal to at least one of the clock circuits of the SoC; and providing, by the control circuit, one of a plurality of outputs of the clock circuits to the output pin after receiving at least one acknowledgement signal from at least one of the clock circuits, when the control circuit determines to operate in the monitoring mode, providing, by the control circuit, one of the outputs to the output pin without providing the request signal to any of the clock circuits.

23. The method of claim 22, further comprises applying a selection signal to a multiplexer of the control circuit to switch from a previous clock signal to a new clock signal only after receiving acknowledgement signals from the clock circuit providing the previous clock signal and the clock circuit providing the new clock signal.

24. The method of claim 23, further comprises applying a division ratio to a clock dividing circuit of the control circuit to perform a dividing operation on an output of the multiplexer using the division ratio only after receiving an acknowledgement signal from the multiplexer.

\* \* \* \* \*